United States Patent
Zhang et al.

(10) Patent No.: US 12,413,829 B2
(45) Date of Patent: Sep. 9, 2025

(54) SYSTEMS AND METHODS FOR CONTROLLABLE VIDEO GENERATION

(71) Applicant: Salesforce, Inc., San Francisco, CA (US)

(72) Inventors: Junhao Zhang, San Jose, CA (US); Dongxu Li, Singapore (SG); Hung Le, Singapore (SG); Caiming Xiong, Menlo Park, CA (US); Doyen Sahoo, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/428,846

(22) Filed: Jan. 31, 2024

(65) Prior Publication Data

US 2025/0175679 A1    May 29, 2025

Related U.S. Application Data

(60) Provisional application No. 63/602,957, filed on Nov. 27, 2023.

(51) Int. Cl.
*H04N 21/81* (2011.01)
*G06T 5/70* (2024.01)
*G06T 9/00* (2006.01)
*G06T 13/80* (2011.01)

(52) U.S. Cl.
CPC ............. *H04N 21/816* (2013.01); *G06T 5/70* (2024.01); *G06T 9/00* (2013.01); *G06T 13/80* (2013.01); *G06T 2207/20182* (2013.01)

(58) Field of Classification Search
CPC ........... H04N 21/816; G06T 5/70; G06T 9/00; G06T 13/80; G06T 2207/20182
See application file for complete search history.

(56) References Cited

U.S. PATENT DOCUMENTS 12,118,787 B2 * 10/2024 Jin .................... G06F 18/22
2024/0395061 A1 * 11/2024 Jin .................... G06V 10/82
2025/0119624 A1 * 4/2025 Oh .................... H04N 21/816

* cited by examiner

*Primary Examiner* — Mulugeta Mengesha
(74) *Attorney, Agent, or Firm* — Haynes and Boone, LLP

(57) ABSTRACT

Embodiments described herein provide a video generation framework built on a decoupled multimodal cross-attention module to simultaneously condition the generation on both an input image and a text input. The video generation may thus be conditioned on the visual appearance of a target object reflected in the input image. In this way, zero-shot video generation may be achieved with little fine-tuning efforts.

20 Claims, 13 Drawing Sheets

SYSTEMS AND METHODS FOR CONTROLLABLE VIDEO GENERATION

CROSS REFERENCE(S)

This application is a nonprovisional of and claims priority under 35 U.S.C. 119 to U.S. provisional application No. 63/602,957, filed Nov. 27, 2023, which is hereby expressly incorporated by reference herein in its entirety.

TECHNICAL FIELD

The embodiments relate generally to generative artificial intelligence (AI) systems, and more specifically to systems and methods for controllable video generation.

BACKGROUND

Generative artificial intelligence (AI) systems have been used in computer vision tasks such as image and/or video generation. For example, text-to-video diffusion models (VDM) are a type of generative AI model that takes an input natural language description (e.g., "a car running with heavy snow") and produces a video that matches that description. However, most existing VDMs are limited to mere text conditional control, which is not always sufficient to precisely describe visual content. In particular, existing VDMs usually lack in control over the visual appearance and geometry structure of the generated videos, rendering video generation largely reliant on chance or randomness.

Figure 1:
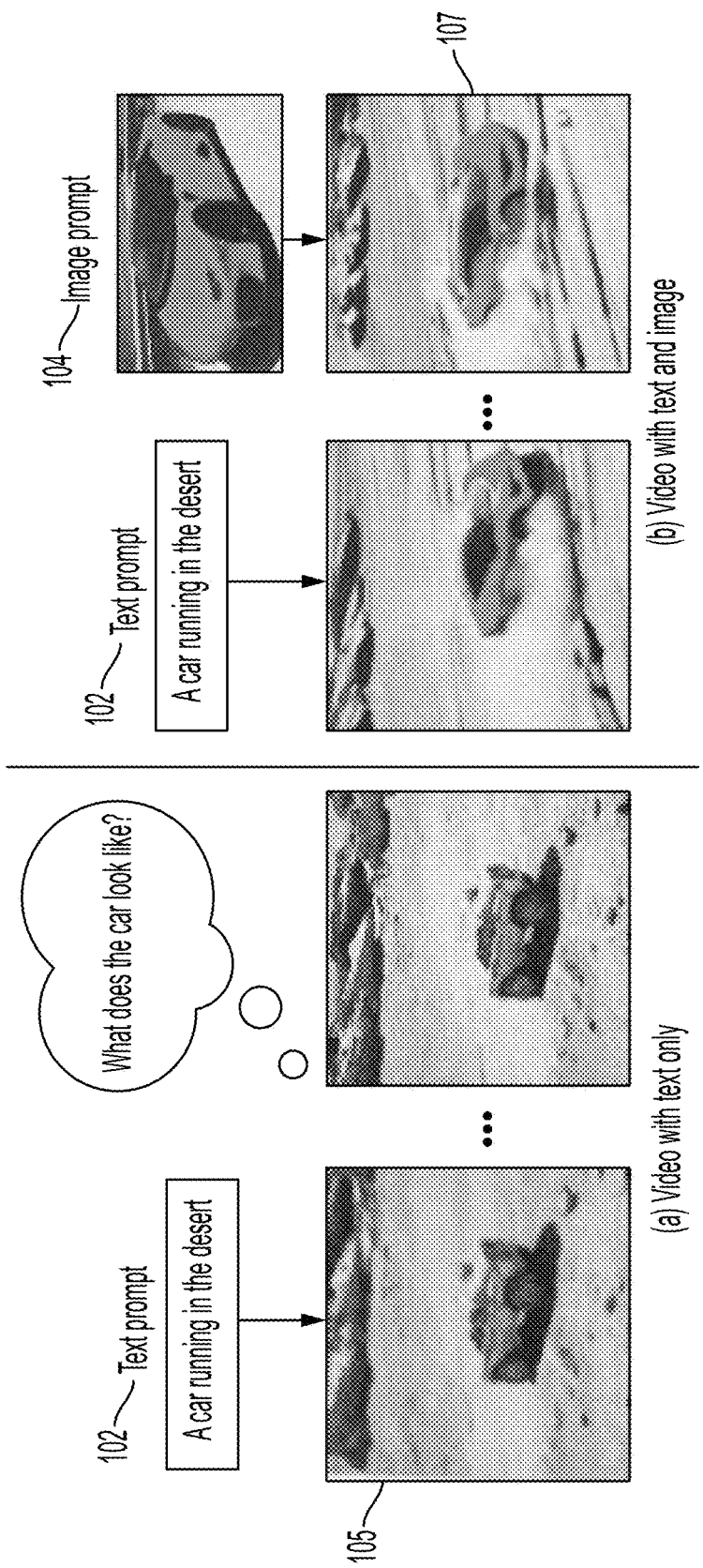
FIG. 1 provides simplified examples illustrating a difference between traditional text-only guided video generation and video generation guided by both image and text, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters.

Overview

Existing VDMs sometimes fail to generate videos that accurately reflect visual content, because text prompts are often not sufficient to describe precisely the visual appearance and geometric structure of target objects in the output video.

In view of the need for video generation with improve depiction of the visual appearance of target objects, embodiments described herein provide a video generation model (VDM) framework that generates a video output conditioned simultaneously on multimodal inputs of image and text. For example, the image input may depict a visual appearance of a target object, and the text input may describe a movement of or a scene containing the target object. FIG. 1 provides simplified examples illustrating a difference between traditional text-only guided video generation and video generation guided by both image and text, according to embodiments described herein. As shown in FIG. 1.(a), in response to the text description 102 of "a car running in the dessert," existing text-only guided video generation at most produces a video 105 that depicts the target object "car" with random visual features, such as the shape, color, make and model, and/or the like, which may or may not be the desired characteristics. In contrast, as shown in FIG. 1.(b), with the same text prompt 102, but an additional image prompt 104 that shows a visual of a blue sports car, a VDM is controlled to generate a video that shows the exact blue sports car in image prompt 104 "running in the dessert" as described by text prompt 102, e.g., see video output 107.

Specifically, the VDM may generate a video output through a U-Net denoising diffusion model, which iteratively removes noises from an initial noise vector conditioned on the image input and the text input. The U-Net denoising diffusion model may be built on a plurality of multimodal video blocks (MVB). Each MVB may comprise spatial temporal layers for representing video features, and a decoupled cross-attention layer for image attention and text attention separately to address image and text inputs for appearance conditioning.

In one embodiment, the spatial temporal layers may comprise a spatial convolution layer, a self-attention layer and a temporal attention layer that aggregates spatial features. Such spatial-temporal layers allows reuse of pre-trained weights from text-to-image generation models without altering its spatial feature distribution, thus subsuming its generation quality.

In one embodiment, the decoupled multimodal cross-attention layer may simultaneously condition the video generation on both image and text inputs. These two conditions complement each other to guide the generation. In addition, the image input (e.g., 104) offers reference visual cues, allowing temporal modules to focus on video consistency. This improves overall generation quality and frame coherence.

In one embodiment, the MVB may further comprise a pre-trained image ControlNet module, which may be immediately integrated to control the geometric structure of the target object in the output video, without needing of extra training overhead.

In this way, the VDM may generate videos whose visual features are controllable through multimodal inputs, and can further utilize geometry inputs, such as depth and edge maps, to control the compositional layout of the generation. Such controllable VDM may be applied for a variety of generative applications, such as image animation and video editing systems. Therefore, with improved performance and controllability on video generation, neural network technology in computer vision is improved.

Figure 2:
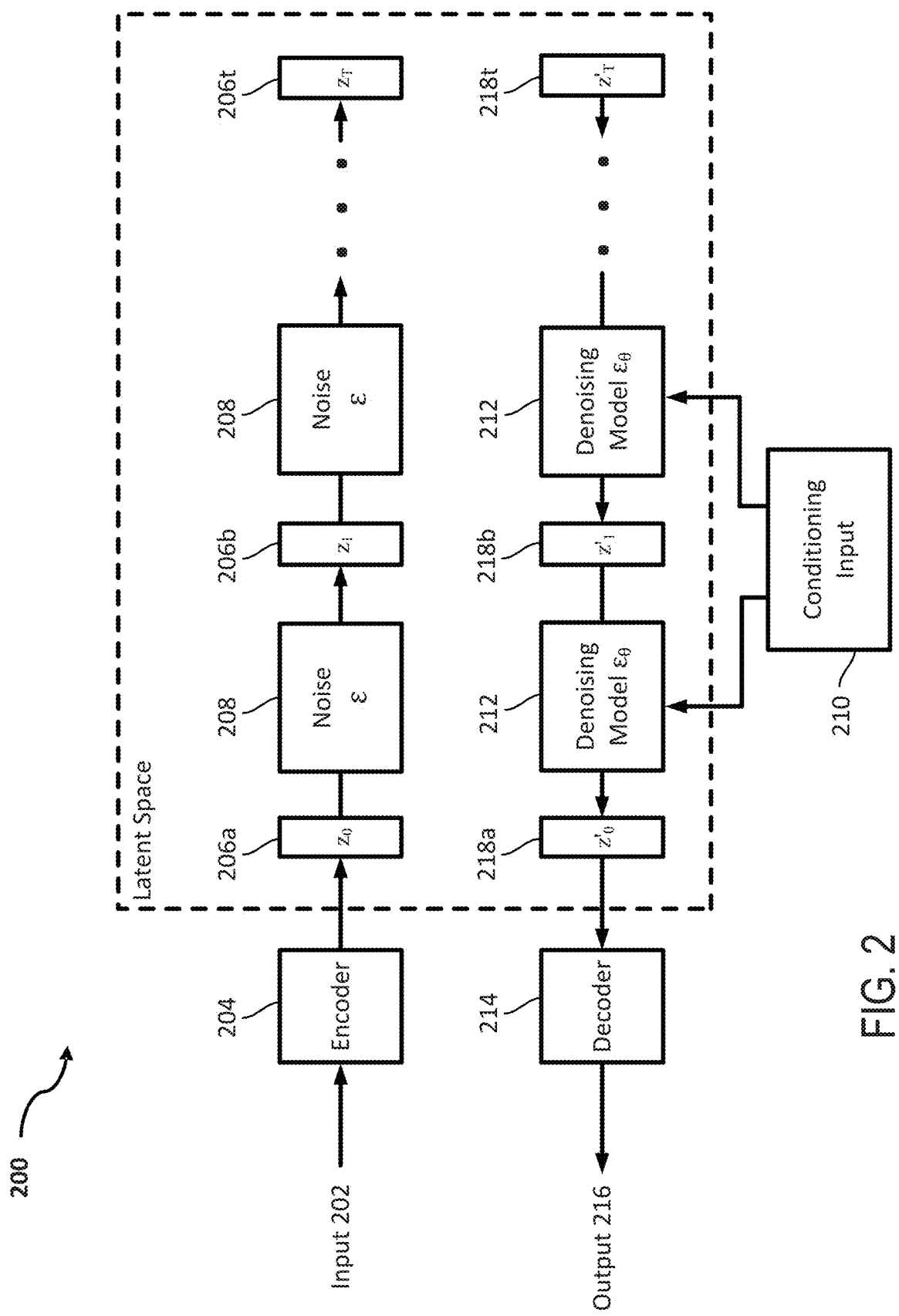
FIG. 2 is a simplified diagram illustrating an exemplary training framework for an example latent diffusion model that generates a video given a conditioning input such as a text description and an image input, according to embodiments described herein.

FIG. 2 is a simplified diagram illustrating an exemplary training framework 200 for an example latent diffusion model that generates a video given a conditioning input such as a text description and an image input, according to embodiments described herein. Specifically, a VDM may comprise a latent diffusion model that generates video outputs by denoising a sequence of Gaussian noises with the guidance of a text prompt (e.g., 102 in FIG. 1) and an image prompt (e.g., 104 in FIG. 1).

In some embodiments, a generative diffusion model (such as U-NET adopted by the VDM described throughout the application) is trained or pre-trained according to training framework 200. In one embodiment, a VDM framework may be built on a U-NET diffusion model comprising a denoising diffusion model that is trained to generate a video (e.g., 107 in FIG. 1) conditioned on multimodal prompts (e.g., a text description 102 and an image prompt 104, which can be contained in conditioning input 210).

At inference, a denoising diffusion model 212 of the VDM that may receive an image prompt (e.g., 104) depicting a visual appearance of a target object, and a text prompt (e.g., 102) describing a movement and/or a scene comprising the target object, and start with a random noise vector as a seed vector, and the denoising model progressively removes "noise" from the seed vector as conditioned by the conditioning input 210 (e.g., the image prompt and the text prompt) such that the resulting video data may gradually align with the conditioning input 210. Completely removing the noise in a single step would be infeasibly difficult computationally. For this reason, the denoising model 212 is trained to remove a small amount of noise, and the denoising step is repeated iteratively so that over a number of iterations (e.g., 50 iterations), the output video and/or video frames may eventually become clear.

Framework 200 illustrates how such a diffusion model may be trained to generate a video given a text prompt and an image prompt by gradually removing noise from a seed vector. The top portion of the illustrated framework 200 including encoder 204 and the noise $\varepsilon$ 208 steps may only be used during the training process, and not at inference, as described below. For example, a training dataset may include a variety of videos, which do not necessarily require any annotations, such as the training dataset 102 in FIG. 1. Some labeled training data in the labeled dataset 102b may be associated with information such as a caption for some video in the training dataset that may be used as a training text prompt during training. The first video frame of the training video may be used as a training image prompt during training. Encoder 204 may encode input 202 of a training video into a latent representation (e.g., a vector) which represents multiple frames of the training video.

In one embodiment, latent vector representation $z_0$ 206a represents the first encoded latent representation of input 202. Noise $\varepsilon$ 208 is added to the representation $z_0$ 206a to produce representation $z_1$ 206b. Noise $\varepsilon$ 208 is then added to representation $z_1$ 206b to produce an even noisier representation. This process is repeated T times (e.g., 50 iterations) until it results in a noised latent representation $z_T$ 206t. The random noise $\varepsilon$ 208 added at each iteration may be a random sample from a probability distribution such as Gaussian distribution. The amount (i.e., variance) of noise $\varepsilon$ 208 added at each iteration may be constant, or may vary over the iterations. The amount of noise $\varepsilon$ 208 added may depend on other factors such as video size or resolution.

This process of incrementally adding noise to latent video representations effectively generates training data that is used in training the diffusion denoising model 212, as described below. As illustrated, denoising model $\varepsilon_\theta$ 212 is iteratively used to reverse the process of noising latents (i.e., perform reverse diffusion) from $z'_T$ 218t to $z'_0$ 218a. Denoising model $\varepsilon_\theta$ 212 may be a neural network based model (such as U-NET), which has parameters that may be learned. Input to denoising model $\varepsilon_\theta$ 212 may include a noisy latent representation (e.g., noised latent representation $z_T$ 206t), and conditioning input 210 such as the training image prompt and the training image prompt. As shown, the noisy latent representation may be repeatedly and progressively fed into denoising model 212 to gradually remove noise from the latent representation vector based on the conditioning input 210, e.g., from $z'_T$ 218t to $z'_0$ 218a.

In one embodiment, the progressive outputs of repeated denoising models $\varepsilon_\theta$ 212 $z'_T$ 218t to $z'_0$ 218a may be an incrementally denoised version of the input latent representation $z'_T$ 218t, as conditioned by a conditioning input 210. The latent video data representation produced using denoising model $s_e$ 212 may be decoded using decoder 214 to provide an output 216 which is the denoised video.

In one embodiment, the output video 216 is then compared with the input training video 202 to compute a loss for updating the denoising model 212 via back propagation. In another embodiment, the latent representation 206a of input 202 may be compared with the denoised latent representation 218a to compute a loss for training. In another embodiment, a loss objective may be computed comparing the noise actually added (e.g., by noise ε 208) with the noise predicted by denoising model $\varepsilon_\theta$ 212. For example, if y represents the text prompt, and y' represents the image prompt, the training loss may be computed as:

$$\mathcal{L} = \mathbb{E}_{z_0, y, y', \epsilon \sim \mathcal{N}(0, I), t \sim \mathcal{U}(0, T)} \left[ \left\| \epsilon - \epsilon_\theta(z_t, t, y, y') \right\|_2^2 \right] \quad (1)$$

where $z_0$ is the latent encoding of training videos from a vision autoencoder (VAE) encoder, $\epsilon$ is the Gaussian noise added to the latent encoding, t is the diffusion timestep (size of iteration) uniformly sampled from (0, T) and $\epsilon_\theta$ is the noise prediction by the model. Denoising model $\varepsilon_\theta$ 212 may then be trained based on loss objectives (e.g., parameters of denoising model $\varepsilon_\theta$ 212 may be updated in order to minimize the loss by gradient descent using backpropagation).

At inference, trained denoising model $\varepsilon_\theta$ 212 may be used to denoise a latent video representation given a conditioning input 210. Rather than a noisy latent video representation $z_T$ 206t, the input to the sequence of denoising models may be a randomly generated vector which is used as a seed vector. Different videos may be generated by providing different random starting seeds. The resulting denoised video representation after T denoising model steps may be decoded by a decoder (e.g., decoder 214) to produce an output video 216 of a denoised video representation. As described above, conditioning input 210 may an image prompt and a text prompt.

Note that while denoising model $\varepsilon_\theta$ 212 is illustrated as the same model being used iteratively, distinct models may be used at different steps of the process. Further, note that a "denoising diffusion model" may refer to a single denoising model $\varepsilon_\theta$ 212, a chain of multiple denoising models $\varepsilon_\theta$ 212, and/or the iterative use of a single denoising model $\varepsilon_\theta$ 212. A "denoising diffusion model" may also include related features such as decoder 214, any pre-processing that occurs to conditioning input 210, etc. This framework 200 of the training and inference of a denoising diffusion model may further be modified to provide improved results and/or additional functionality, for example as in embodiments described herein.

Figure 3A:
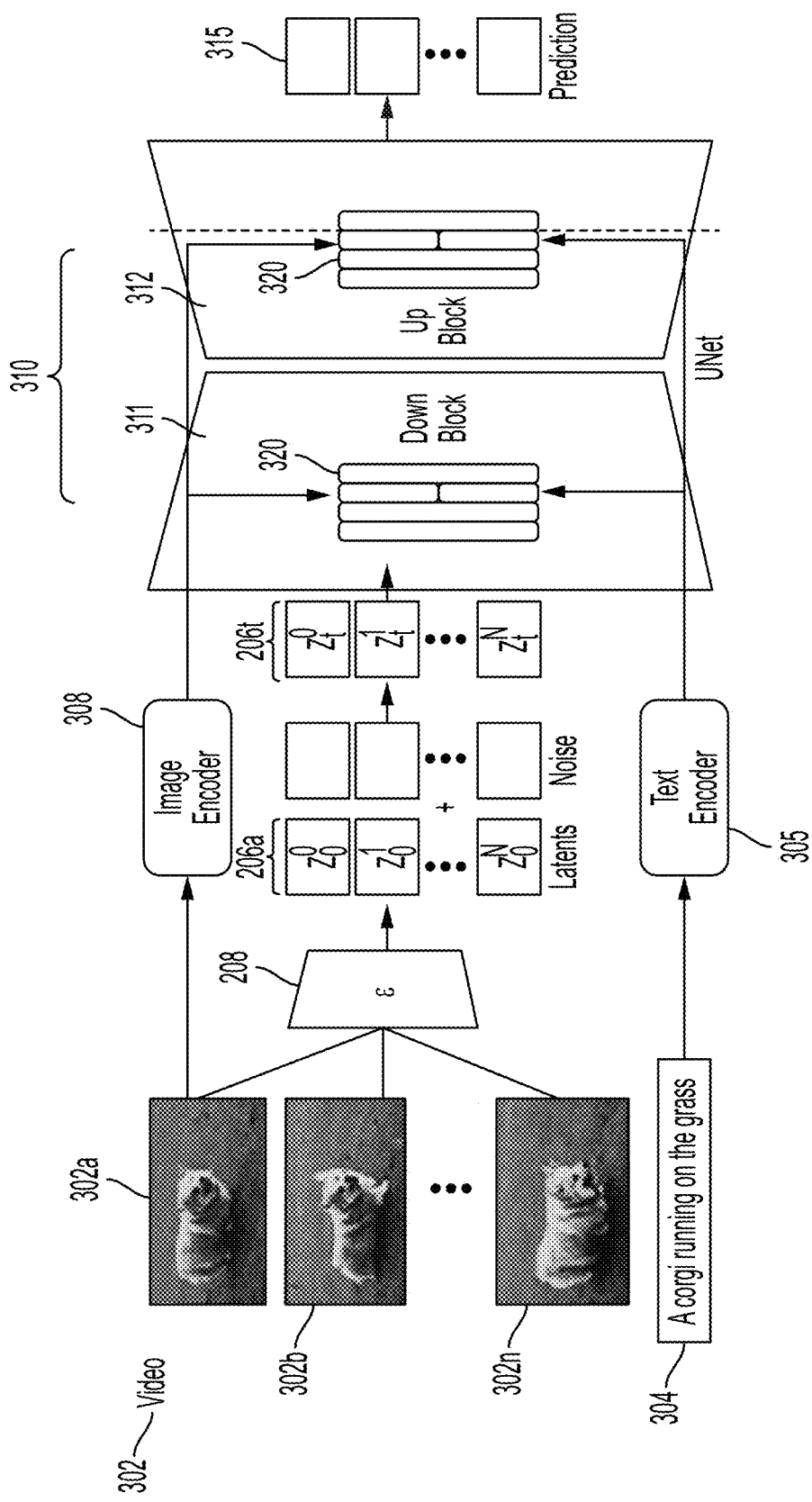
FIG. 3A is a simplified diagram illustrating the video diffusion model (VDM) framework trained to generate a video guided by both an image input and a text input, according to some embodiments described herein.

FIG. 3A is a simplified diagram illustrating the VDM diffusion framework trained to generate a video guided by both an image input and a text input, according to some embodiments described herein. As discussed in relation to FIG. 2, the video generation framework architecture may be built on a U-NET diffusion model that generates videos by denoising a sequence of Gaussian noises with the guidance of a text prompt and an image prompt.

In one embodiment, as discussed in relation to FIG. 2, during training of the U-NET diffusion model 310 (e.g., similar to denoising model 212), a training video 302 which may be sampled into N video frames 302a-n. Latent representations of the video frames may be iteratively added a Gaussian noise term 208 into latent representations $(z_0^0, \ldots, z_T^N)$ 206a to $(z_0^T, \ldots, z_T^N)$ 206t after T iterations. The noised video frames $(z_T^0, \ldots, z_T^N)$ 206t may then be input to the U-NET diffusion model 310 for denoising.

For example, denoising model 212 shown in FIG. 2 may be a U-NET-like model 310 comprising a downblock 311 and an upblock 312. The downblock 311 may serve as an encoder of the U-NET diffusion model, which captures the context and hierarchical features of an input image or an input latent representation. The upblock 312 may serve as a part of the decoder in U-Net, which may upsample a low-resolution feature maps obtained from the upblock 312 to the original input resolution. The downblock 311 and the upblock 312 are connected by a bottleneck to capture both global context (through the encoder downblock 311) and local details (through the decoder upblock 312) in the prediction output 315. A forward pass through the U-NET diffusion model 310 may generate a prediction output 315 $(z_{t-1}^0, \ldots, z_{t-1}^N)$ that removes a predicted noise from the input $(z_t^0, \ldots, z_t^N)$ to the U-NET diffusion model 310. After T iterations, the U-NET diffusion model 310 may predict a final video or in the form of a predicted noise term.

In one embodiment, at each iteration of denoising, each of the downblock 311 and upblock 312 comprises a plurality of MVBs 320. During one forward pass of the U-NET diffusion model 310, each MVB 320 may propagate data forward through two groups of layers, spatial temporal U-Net layers and decoupled multimodal cross-attention layers that captures image cross-attention from an input image prompt and text cross-attention from a text input prompt for the video generation. FIG. 3B shows a blow-up view of the MVB block 320, which comprises a spatial convolution layer (ResNet2D) 321, a self-attention layer 322, decoupled multimodal cross-attention layers 323-324 comprising an image cross-attention layer 323 and a text cross-attention layer 324 in parallel, and a temporal attention layer 325. Specifically, spatial layers 312-322 and decoupled multimodal cross-attention layers 323-324 are reused from a pretrained ControlNet and remain frozen during training, and only the temporal layer 325 may be turned. In this way, video generation may be conditioned on geometry visual inputs by broadcasting it along the temporal axis.

Referring back to FIG. 3A, during training, a text prompt 304 may be a text description accompanying the training video 302, and an input image prompt 302a may be the first video frame of the training video 302. An image encoder 308 may encode the image prompt 302a into image embeddings and a text encoder 305 may encode the text prompt 304 into text embeddings. The image embeddings and text embeddings are in turn fed to the decoupled multimodal cross-attention layers 323 and 324, respectively, at each MVB block 320 for capture image cross-attention and text cross-attention.

Figure 3C:
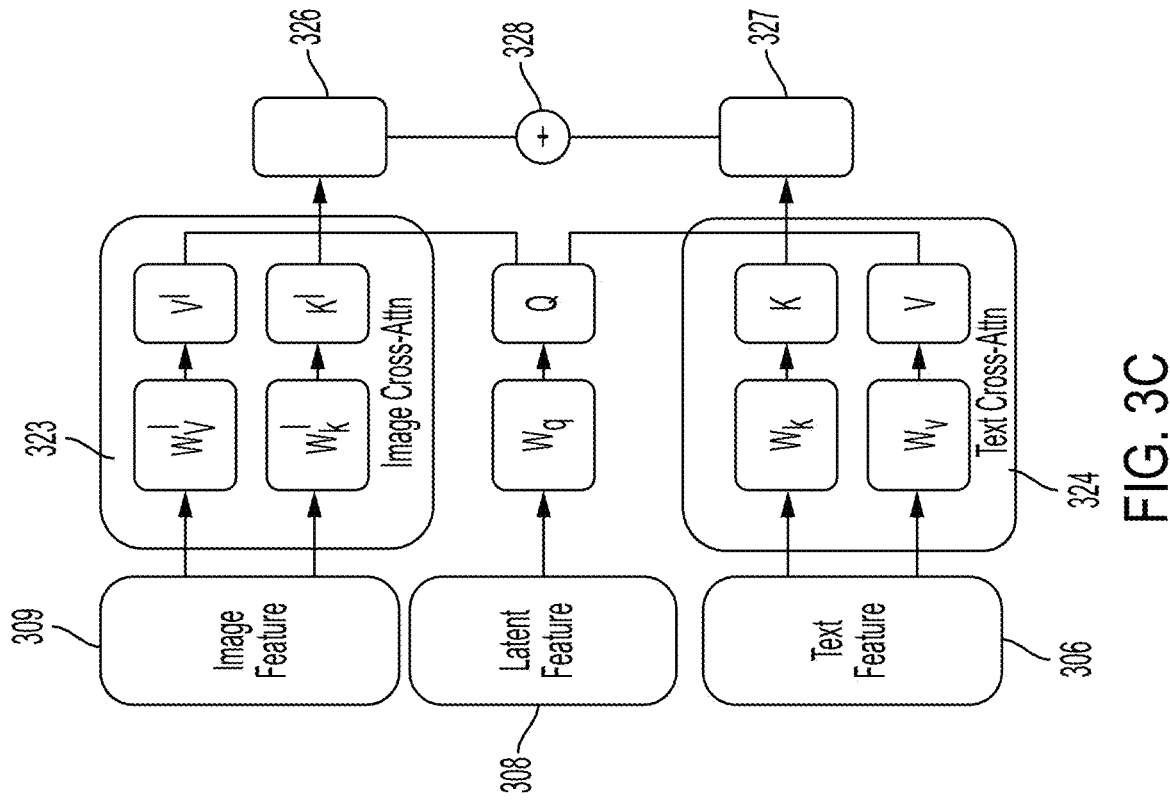
FIG. 3C is a simplified diagram illustrating aspects of computing image cross-attention and text cross-attention at the decoupled multimodal cross-attention layers inside the MVB shown in FIG. 3B, according to embodiments described herein.
Figure 3B:
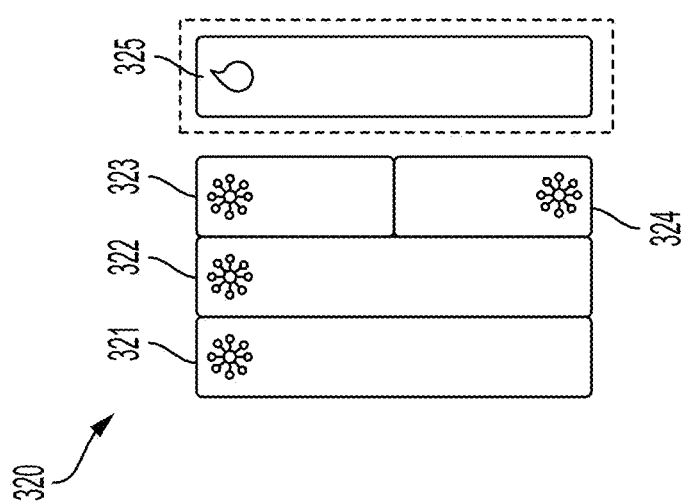
FIG. 3B shows a blow-up view of the multi-modal video block (MVB) inside the VDM shown in FIG. 3A, according to embodiments described herein.

FIG. 3C is a simplified diagram illustrating aspects of computing image cross-attention and text cross-attention at the decoupled multimodal cross-attention layers 323 and 324, according to embodiments described herein. In one embodiment, U-Net latent features $f_x$ 308 may be generated by the spatial layers 321-322 in response to an input to the respective MVB 320. Given $f_y$ the text feature embedding 306 of text prompts encoded by the text encoder 305, the U-NET diffusion model 310 may condition on text features 306 to enhance the U-Net latent features $f_x$ 308 via cross-attention layers 323 and 324. Specifically, the query Q is obtained by projecting U-Net features $f_x$ 308 via a projecting layer $W_q$. At text cross-attention layer 324, key K and value V are obtained by projecting the text embedding $f_y$ 306; and at image cross-attention layer 323, extra key and value $K^I$, $V^I$ are obtained by projecting image embedding $f_{y'}$ 309:

$$Q = W_Q \cdot f_x; K = W_K \cdot f_y; V = W_V \cdot f_y; K^I = W_K^I \cdot f_{y'}; V^I = W_V^I \cdot f_{y'}$$

Where $Q \in \mathbb{R}^{BN \times H \times W \times C}$, K, $V \in \mathbb{R}^{BN \times L \times C}$, $K^I$, $V^I \in \mathbb{R}^{BN \times L \times C}$ with B the batch size, N the number of frames, H the height, W the width and C the number of channels, L the number of text tokens, d the hidden size. Note that text embeddings are duplicated for video frames. The cross attention is computed as:

$$CrossAttention(Q, K, V) = \text{softmax}\left(\frac{QK^T}{\sqrt{d}}\right) \cdot V.$$

Therefore, the image cross-attention layer 323 computes an image attention 326 CrossAttention (Q, $K^I$, $V^I$), $$CrossAttention(Q, K^I, V^I) = \text{softmax}\left(\frac{Q(K^I)^T}{\sqrt{d}}\right) \cdot V^I.$$

and the text cross-attention layer 324 computes a text attention 327 CrossAttention (Q K, V), which are combined to generate a combined cross-attention 328:

CrossAttention(Q,K,V)+CrossAttention(Q,$K^I$,$V^I$)

With reference back to FIGS. 3A-3B, the combined attention 328 is fed to the subsequent temporal attention layer 325 for capturing temporal attention. The combined attention 328 conditioning on visual cues allows the subsequent temporal modules to focus more on maintaining temporal consistency, resulting in smoother and higher-quality video outputs.

For example, at training, spatial weights may be initialized and then are fixed throughout the training process. Initially, the image cross-attention layers 323 may be trained using the CC3M dataset at a resolution of 512×320. Subsequently, the spatial weights are kept unchanged and only the temporal attention layers 325 are trained. This training step utilizes the WebVid10M dataset, each clip sampled 16 frames at a 512×320 resolution, with conditioning on video captions as the text conditions 304 and the first frame 302a as image conditions. Further refinement is carried out on a set of 1000 videos from the InternVideo collection, which removes watermarks. The training process may be implemented at 16 A100 40G GPUs.

At inference, the U-NET diffusion model 310 may receive an input image which may be fed to the image encoder 308, and a text input which may be fed to the text encoder 305, and a seed noise vector (e.g., in place of 206*t*) that is fed to the downblock 311. The U-NET diffusion model 310 may then iteratively denoise the seed noise vector to produce a denoised vector representing an output video.

Computer and Network Environment

Figure 4:
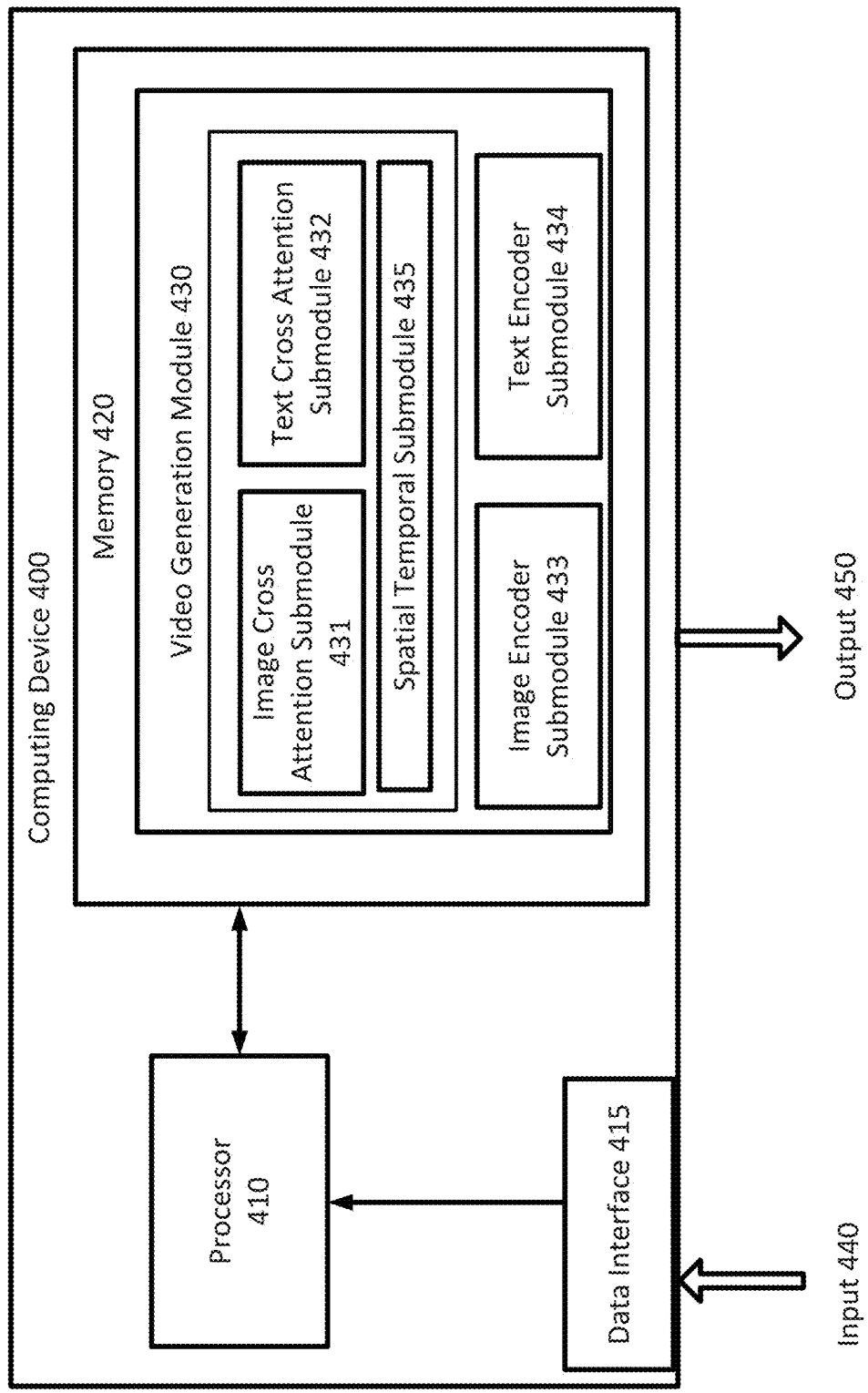
FIG. 4 is a simplified diagram illustrating a computing device implementing the video generation framework described in FIGS. 1-3C, according to some embodiments.

FIG. 4 is a simplified diagram illustrating a computing device implementing the video generation framework described in FIGS. 1-3C, according to one embodiment described herein. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for video generation module 430 that may be used to implement and/or emulate the systems and models, and/or to implement any of the methods described further herein. video generation module 430 may receive input 440 such as an input training data (e.g., image-text pairs) via the data interface 415 and generate an output 450 which may be a generated video.

The data interface 415 may comprise a communication interface, a user interface (such as a voice input interface, a graphical user interface, and/or the like). For example, the computing device 400 may receive the input 440 (such as a training dataset) from a networked database via a communication interface. Or the computing device 400 may receive the input 440, such as an input image and an input text, from a user via the user interface.

In some embodiments, the video generation module 430 is configured to generate a video conditioned on the input image and the input text prompt. The video generation module 430 may further include a neural network structure such as a U-NET diffusion model that comprises submodules such as an image cross-attention submodule 431 (e.g., similar to 323 in FIG. 3B-3C), a text cross attention submodule 432 (e.g., similar to 324 in FIGS. 3B-3C), an image encoder 433 (e.g., similar to 308 in FIG. 3A), a text encoder submodule 433 (e.g., similar to 305 in FIG. 3A), and a spatial temporal submodule 435 (e.g., similar to layers 321, 322 and 325 in FIG. 3B).

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5:
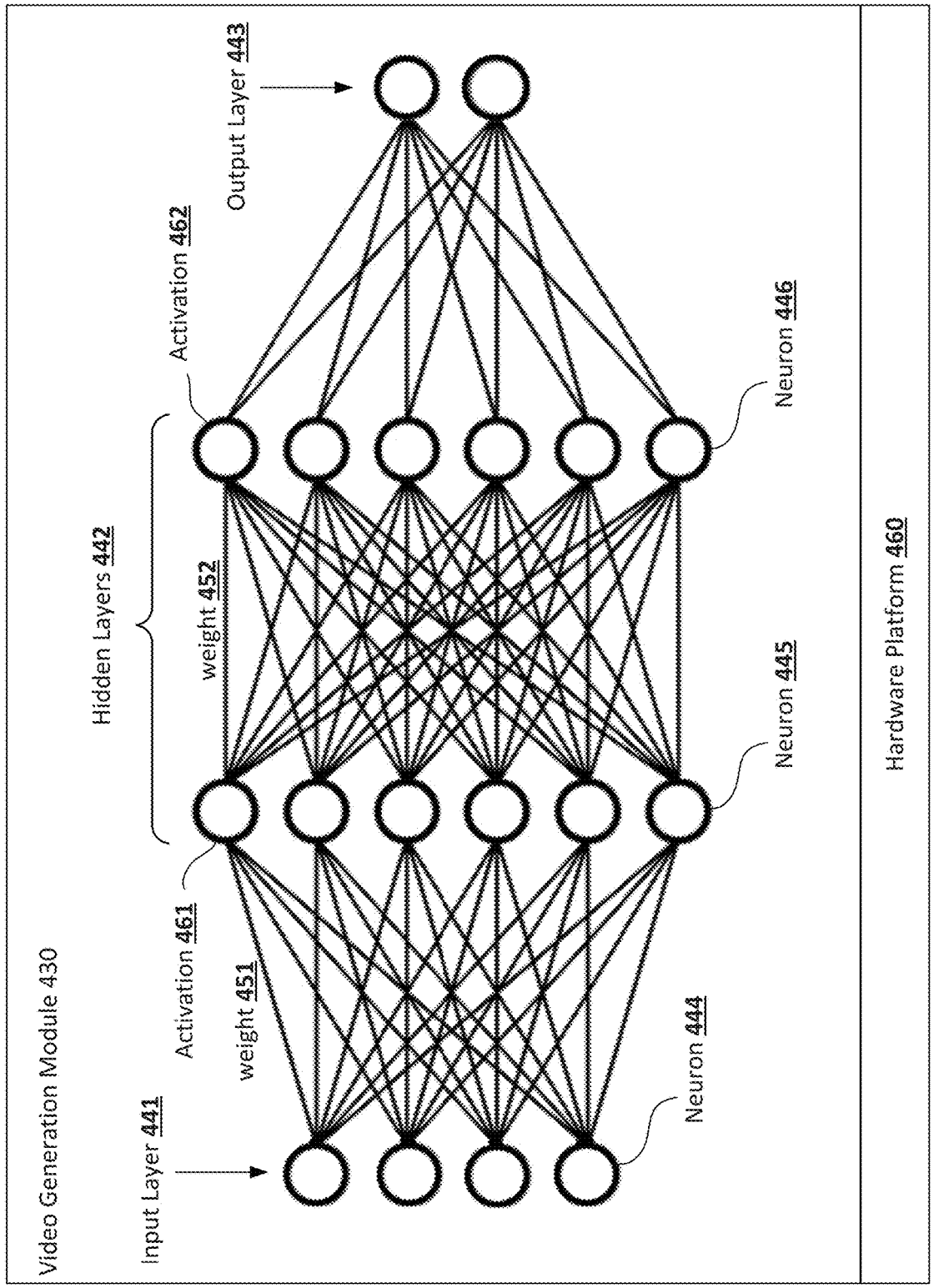
FIG. 5 is a simplified diagram illustrating a neural network structure, according to some embodiments.

FIG. 5 is a simplified diagram illustrating the neural network structure implementing the video generation module 430 described in FIG. 4, according to some embodiments. In some embodiments, the video generation module 430 and/or one or more of its submodules 431-435 may be implemented at least partially via an artificial neural network structure shown in FIG. 5. The neural network comprises a computing system that is built on a collection of connected units or nodes, referred to as neurons (e.g., 444, 445, 446). Neurons are often connected by edges, and an adjustable weight (e.g., 451, 452) is often associated with the edge. The neurons are often aggregated into layers such that different layers may perform different transformations on the respective input and output transformed input data onto the next layer.

For example, the neural network architecture may comprise an input layer 441, one or more hidden layers 442 and an output layer 443. Each layer may comprise a plurality of neurons, and neurons between layers are interconnected according to a specific topology of the neural network topology. The input layer 441 receives the input data (e.g., 440 in FIG. 4A), such as an input image and an input text. The number of nodes (neurons) in the input layer 441 may be determined by the dimensionality of the input data (e.g., the length of a vector of a latent feature of the input image). Each node in the input layer represents a feature or attribute of the input.

The hidden layers 442 are intermediate layers between the input and output layers of a neural network. It is noted that two hidden layers 442 are shown in FIG. 4B for illustrative purpose only, and any number of hidden layers may be utilized in a neural network structure. Hidden layers 442 may extract and transform the input data through a series of weighted computations and activation functions.

For example, as discussed in FIG. 4, the video generation module 430 receives an input 440 of an input image and transforms the input into an output 450 of an image representation. To perform the transformation, each neuron receives input signals, performs a weighted sum of the inputs according to weights assigned to each connection (e.g., 451, 452), and then applies an activation function (e.g., 461, 462, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 441 is transformed into rather different values indicative data characteristics corresponding to a task that the neural network structure has been designed to perform.

The output layer 443 is the final layer of the neural network structure. It produces the network's output or prediction based on the computations performed in the preceding layers (e.g., 441, 442). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the video generation module 430 and/or one or more of its submodules 431-335 may comprise the transformative neural network structure of layers of neurons, and weights and activation functions describing the non-linear transformation at each neuron. Such a neural network structure is often implemented on one or more hardware processors 410, such as a graphics processing unit (GPU). An example neural network may be a convolutional neural network (CNN) based U-NET diffusion model, and/or the like.

In one embodiment, the video generation module 430 and its submodules 431-335 may be implemented by hardware, software and/or a combination thereof. For example, the video generation module 430 and its submodules 431-435 may comprise a specific neural network structure implemented and run on various hardware platforms 460, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 460 used to implement the neural network structure is specifically configured based on factors such as the complexity of the neural network, the scale of the tasks (e.g., training time, input data scale, size of training dataset, etc.), and the desired performance.

In one embodiment, the neural network based video generation module 430 and one or more of its submodules 431-435 may be trained by iteratively updating the underlying parameters (e.g., weights 451, 452, etc., bias parameters and/or coefficients in the activation functions 461, 462 associated with neurons) of the neural network based on the loss described in Eq.(1). For example, during forward propagation, the training data such as a training image or a training text are fed into the neural network. The data flows through the network's layers 441, 442, with each layer performing computations based on its weights, biases, and activation functions until the output layer 443 produces the network's output 450. In some embodiments, output layer 443 produces an intermediate output on which the network's output 450 is based.

The output generated by the output layer 443 is compared to the expected output (e.g., a "ground-truth" such as the corresponding image or video frame) from the training data, to compute a loss function that measures the discrepancy between the predicted output and the expected output. For example, the loss function may be Eq. (1). Given the loss, the negative gradient of the loss function is computed with respect to each weight of each layer individually. Such negative gradient is computed one layer at a time, iteratively backward from the last layer 443 to the input layer 441 of the neural network. These gradients quantify the sensitivity of the network's output to changes in the parameters. The chain rule of calculus is applied to efficiently calculate these gradients by propagating the gradients backward from the output layer 443 to the input layer 441.

Parameters of the neural network are updated backwardly from the last layer to the input layer (backpropagating) based on the computed negative gradient using an optimization algorithm to minimize the loss. The backpropagation from the last layer 443 to the input layer 441 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as image animation.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters. For example, as discussed in relation to FIG. 3B, during the training of U-NET diffusion model 310, the spatial layers 321, 322 and the decoupled cross-attention layers 323-324 may be frozen, which reuses pretrained layers from ControlNet.

Therefore, the training process transforms the neural network into an "updated" trained neural network with updated parameters such as weights, activation functions, and biases. The trained neural network thus improves neural network technology in computer vision such as image animation, video editing.

Figure 6:
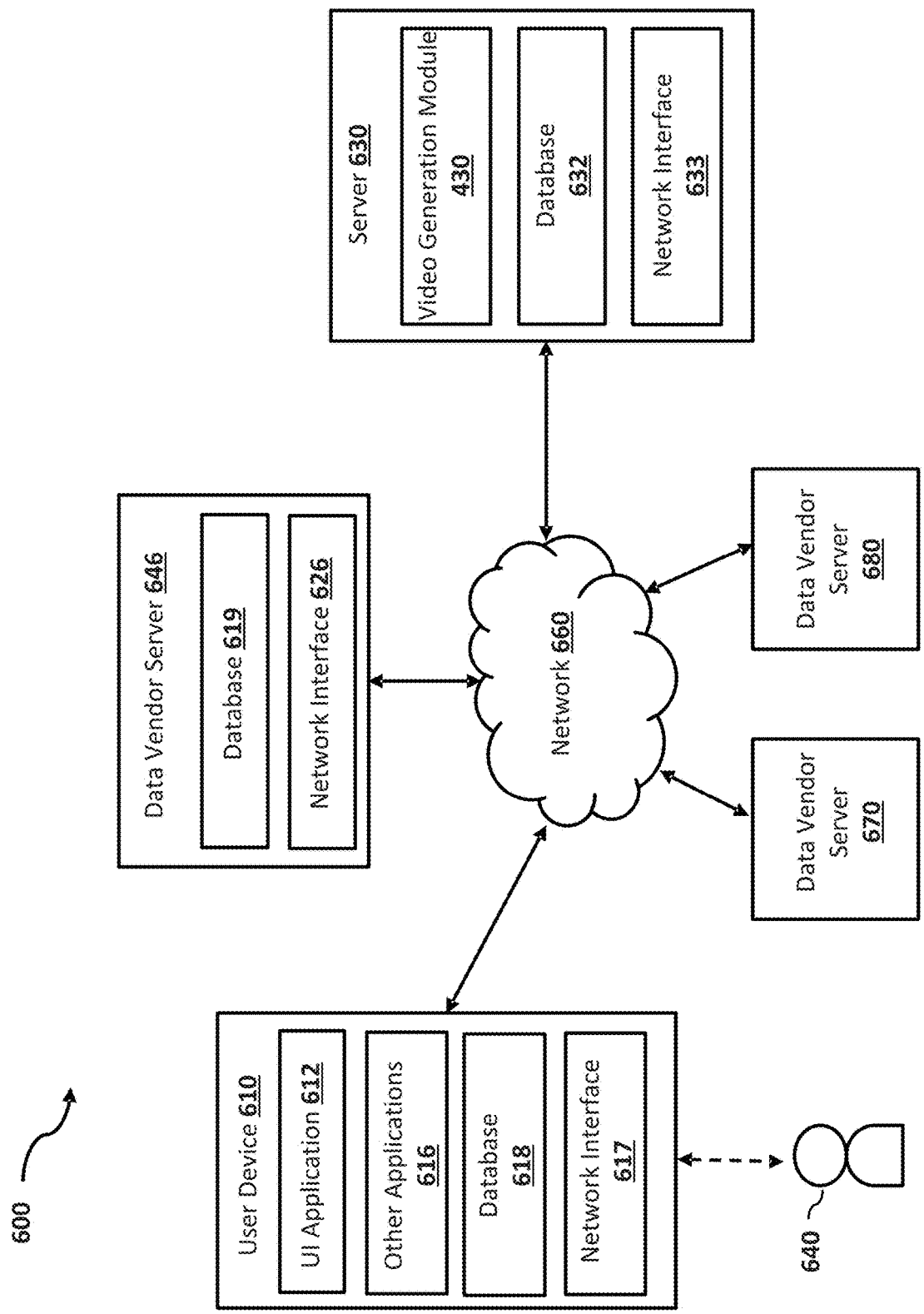
FIG. 6 is a simplified block diagram of a networked system suitable for implementing the video generation framework described in FIGS. 1-4 and other embodiments described herein.

FIG. 6 is a simplified block diagram of a networked system 600 suitable for implementing the video generation framework described in FIGS. 1-5 and other embodiments described herein. In one embodiment, system 600 includes the user device 610 which may be operated by user 640, data vendor servers 645, 670 and 680, server 630, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4, operating an OS such as a MICROSOFT® OS, a UNIX® OS, a LINUX® OS, or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 610, data vendor servers 645, 670 and 680, and the server 630 may communicate with each other over a network 660. User device 610 may be utilized by a user 640 (e.g., a driver, a system admin, etc.) to access the various features available for user device 610, which may include processes and/or applications associated with the server 630 to receive a generated video.

User device 610, data vendor server 645, and the server 630 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

User device 610 may be implemented as a communication device that may utilize appropriate hardware and software configured for wired and/or wireless communication with data vendor server 645 and/or the server 630. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and/or other applications 616, which may correspond to executable processes, procedures, and/or applications with associated hardware. For example, the user device 610 may receive a message indicating a generated video from the server 630 and display the message via the UI application 612. In other embodiments, user device 610 may include additional or different modules having specialized hardware and/or software as required.

In various embodiments, user device 610 includes other applications 616 as may be desired in particular embodiments to provide features to user device 610. For example, other applications 616 may include security applications for implementing client-side security features, programmatic client applications for interfacing with appropriate application programming interfaces (APIs) over network 660, or other types of applications. Other applications 616 may also include communication applications, such as email, texting, voice, social networking, and IM applications that allow a user to send and receive emails, calls, texts, and other notifications through network 660. For example, the other application 616 may be an email or instant messaging application that receives a video from the server 630. Other applications 616 may include device interfaces and other display modules that may receive input and/or output information. For example, other applications 616 may contain software programs for asset management, executable by a processor, including a graphical user interface (GUI) configured to provide an interface to the user 640 to view the generated video.

User device 610 may further include database 618 stored in a transitory and/or non-transitory memory of user device 610, which may store various applications and data and be utilized during execution of various modules of user device 610. Database 618 may store user profile relating to the user 640, predictions previously viewed or saved by the user 640, historical data received from the server 630, and/or the like. In some embodiments, database 618 may be local to user device 610. However, in other embodiments, database 618 may be external to user device 610 and accessible by user device 610, including cloud storage systems and/or databases that are accessible over network 660.

User device 610 includes at least one network interface component 617 adapted to communicate with data vendor server 645 and/or the server 630. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 645 may correspond to a server that hosts database 619 to provide training datasets including training images/texts to the server 630. The database 619 may be implemented by one or more relational database, distributed databases, cloud databases, and/or the like.

The data vendor server 645 includes at least one network interface component 626 adapted to communicate with user device 610 and/or the server 630. In various embodiments, network interface component 626 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 645 may send asset information from the database 619, via the network interface 626, to the server 630.

The server 630 may be housed with the video generation module 430 and its submodules described in FIG. 4. In some implementations, video generation module 430 may receive data from database 619 at the data vendor server 645 via the network 660 to generate a video. The generated video may also be sent to the user device 610 for review by the user 640 via the network 660.

The database 632 may be stored in a transitory and/or non-transitory memory of the server 630. In one implementation, the database 632 may store data obtained from the data vendor server 645. In one implementation, the database 632 may store parameters of the video generation module 430. In one implementation, the database 632 may store previously generated videos, and the corresponding input feature vectors.

In some embodiments, database 632 may be local to the server 630. However, in other embodiments, database 632 may be external to the server 630 and accessible by the server 630, including cloud storage systems and/or databases that are accessible over network 660.

The server 630 includes at least one network interface component 633 adapted to communicate with user device 610 and/or data vendor servers 645, 670 or 680 over network 660. In various embodiments, network interface component 633 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

Example Work Flow

Figure 7:
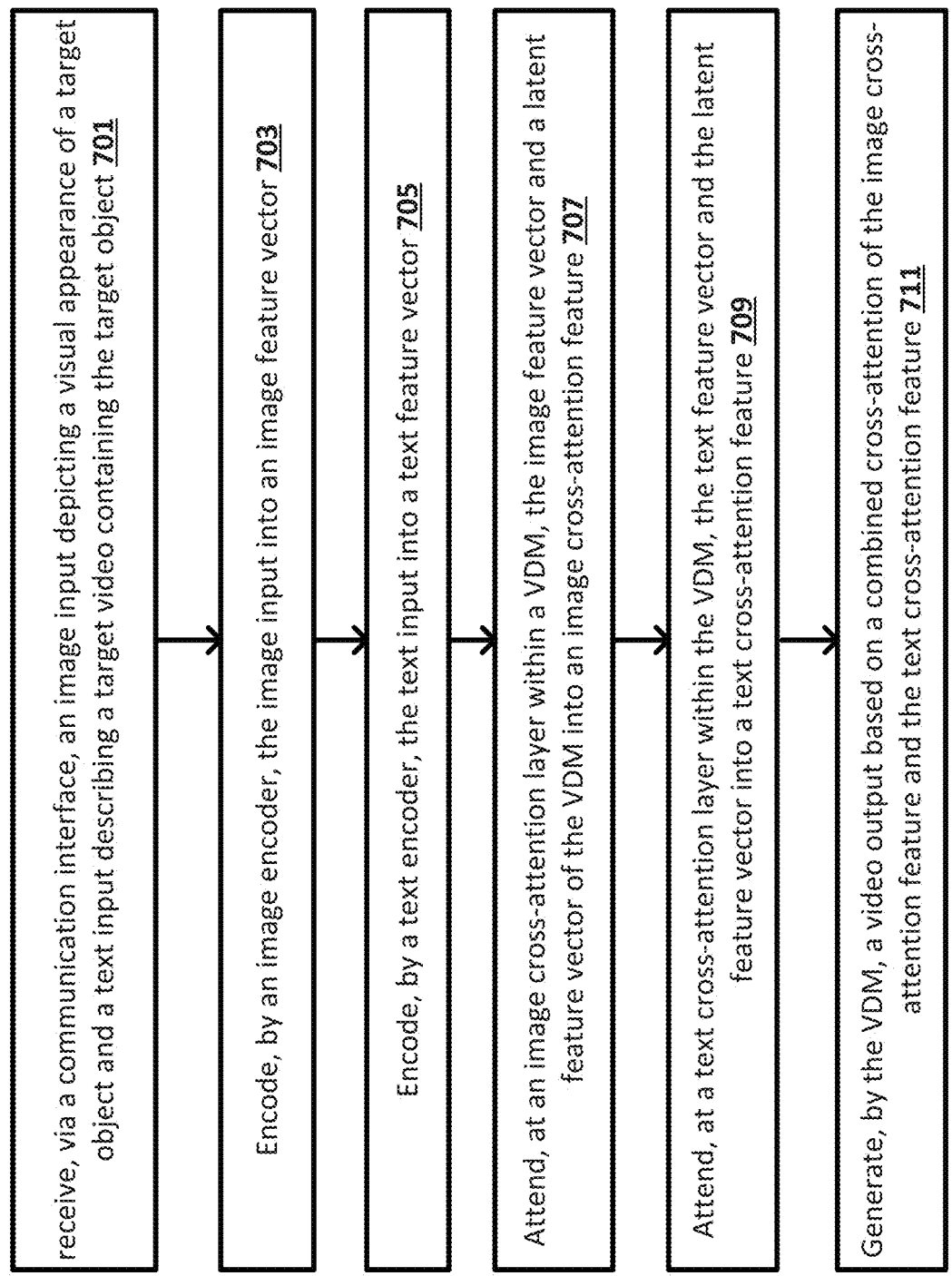
FIG. 7 is an example logic flow diagram illustrating a method of video generation conditioned on an image and a text description shown in FIGS. 1-6, according to some embodiments described herein.

FIG. 7 is an example logic flow diagram illustrating a method of video generation conditioned on an image and a text description shown in FIGS. 1-6, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the video generation module 430 (e.g., FIGS. 4 and 6).

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, the method 700 may receive, at a communication interface (e.g., data interface 415 in FIG. 4, and network interface 633 in FIG. 6), an image input (e.g., 104 in FIG. 1) depicting a visual appearance of a target object and a text input (e.g., 102 in FIG. 1) describing a target video containing the target object.

At step 703, the method 700 may encode, by an image encoder (e.g., 308 in FIG. 3A) the image input into an image feature vector (e.g., 309 in FIG. 3C).

At step 705, the method 700 may encode, by a text encoder (e.g., 305 in FIG. 3A), a text input into a text feature vector (e.g., 306 in FIG. 3C).

At step 707, the method 700 may attend, at an image cross-attention layer (e.g., 323 in FIG. 3C) within a VDM (e.g., U-NET diffusion model 310 in FIG. 3A, the image feature vector (e.g., 309 in FIG. 3C) and a latent feature vector (e.g., 308 in FIG. 3C) of the VDM into an image cross-attention feature (e.g., 326 in FIG. 3C). For example, the latent feature vector of the VDM is generated by a spatial convolution layer (e.g., 321 in FIG. 3B) and a self-attention layer (e.g., 322 in FIG. 3B) from an input to a respective multimodal video block (e.g., 320 in FIG. 3B).

At step 709, the method 700 may attend, at a text cross-attention layer (e.g., 324 in FIG. 3C) within the VDM, the text feature vector (e.g., 306 in FIG. 3C) and the latent feature vector (e.g., 308 in FIG. 3C) into a text cross-attention feature (e.g., 327 in FIG. 3C).

At step 711, the method 700 may generate, by the VDM, a video output based on a combined cross-attention (e.g., 328 in FIG. 3C) of the image cross-attention feature (e.g., 326 in FIG. 3C) and the text cross-attention feature (e.g., 327 in FIG. 3C). For example, a temporal-attention layer (e.g., 325 in FIG. 3B) may generate a respective multimodal video block output that captures temporal features from the combined cross-attention, and the respective multimodal video block output to a next multimodal video block. The video output is then generated by the VDM iteratively removing noises from an initialized vector conditioned on the image input and the text input over one or more iterations. At each iteration, the VDM generates an updated vector output from a previous vector output from a previous iteration based on the combined cross-attention from the image cross-attention layer and the text cross-attention layer.

In one embodiment, the VDM is trained by using a training video (e.g., 302 in FIG. 3A) and a training text (e.g., 304 in FIG. 3A), and a video frame (e.g., 302a in FIG. 3A) sampled from the training video as a conditioning image. The VDM may iteratively add a noise term (e.g., 208 in FIG. 3A) to the training video into a noised video representation (e.g., $206t$ in FIG. 3A). The VDM may then iteratively denoises the noised video (e.g., 302 in FIG. 3A) by predicting an added noise term conditioned on the conditioning image and the training text. The VDM may then be updated based on a loss objective computed based on a difference between the noised term and the predicted added noise term.

Example Data Experiments

Figure 8:
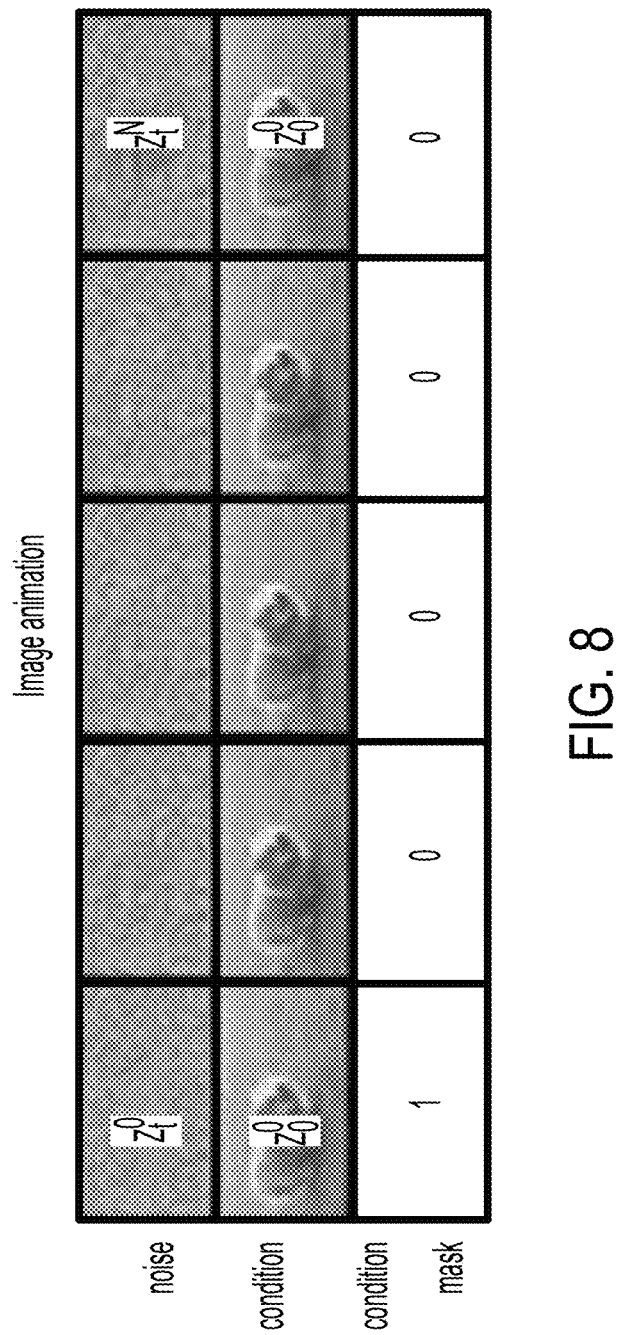
FIG. 8 is a diagram illustrating aspects of adapting the VDM described in FIGS. 1-7 for masked condition for image animation, according to embodiments described herein.

FIG. 8 is a diagram illustrating aspects of adapting the VDM described in FIGS. 1-7 for masked condition for image animation, according to embodiments described herein. With the additional conditioning on image input, the VDM may be applied for the task of image animation, e.g., to transform an input image of a target object into a short video clip with consistent content. To enhance the content consistency, mask-conditioning may be applied for image animation. For example, to train the VDM for an image animation task using a training animation video (e.g., 302 in FIG. 3A), the first frame of the training video is used as an additional input condition for the U-NET (e.g., 310 in FIG. 3A). As shown in FIG. 8, latent channels for $z_t^0, z_t^1, \ldots z_t^N$ may be added to the U-NET's input. For example, among the latent channels, four channels represent the replicated first frame latent $z_0^0$, and one binary channel is used to denote the masked frames.

In this way, the masking encourages that the identity of the subject in the animated video remains identical to that in the conditioning image. Incorporating an image cross attention layer (e.g., 323 in FIGS. 3B-3C) in image animation helps significantly to prevent sudden changes in appearance and reduce temporal flickering, which are seen commonly in models driven merely by text conditions.

Figure 9:
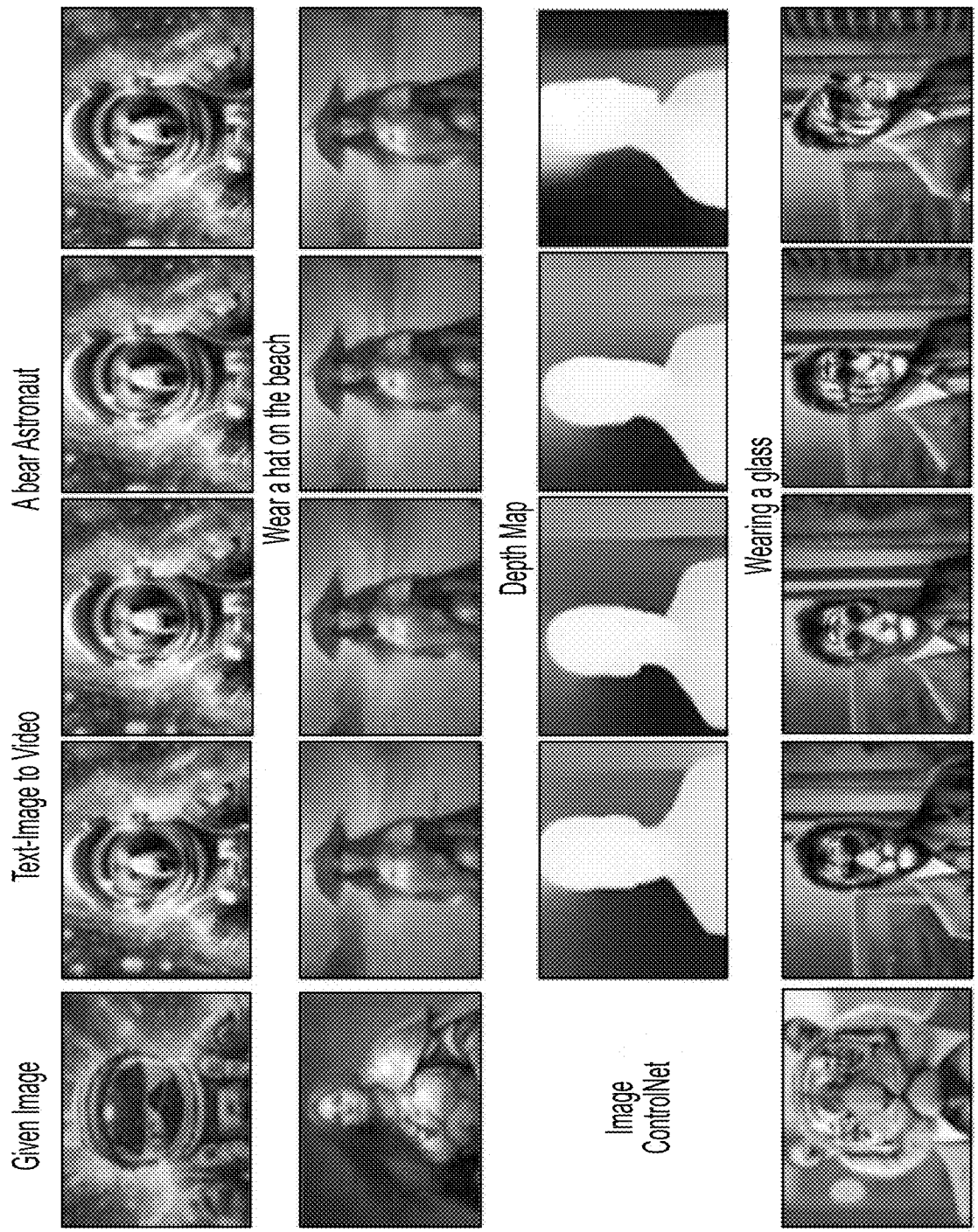
FIG. 9 shows example customized videos that align with both the subject of image condition and the text condition, according to embodiments described herein.

FIG. 9 shows example customized videos that align with both the subject of image condition and the text condition. Additionally, the image ControlNet may be directly integrated to realize control over geometric structures. The subject-customized video generation is conducted on the DreamBooth dataset, which includes 30 subjects, each with 4-7 text prompts. DINO and CLIP-I scores are used to assess subject alignment, and CLIP-T for video-text alignment, calculating average scores for all frames. As shown in Table I, VDM achieves strong zero-shot customization, surpassing non-customized text-to-video (T2V) models by a large margin. Different from AnimateDiff, which requires repetitive re-training for new subjects, VDM utilizes pre-trained decoupled multimodal attention layers, achieving zero-shot customization with compared performance. If finetuned with as few as 80 steps, VDM further surpasses AnimateDiff by a significant mar-gin, demonstrating the effectiveness of VDM.

TABLE 1

| Model | DINO | CLIP-I | CLIP-T |
| --- | --- | --- | --- |
| Non-Customized T2V | 0.283 | 0.594 | 0.296 |
| I2VGen-XL | 0.542 | 0.737 | 0.218 |
| Animate Diff 300 finetune steps | 0.582 | 0.784 | 0.243 |
| VDM (zero-shot) | 0.556 | 0.763 | 0.292 |
| VDM (80 finetune steps) | 0.624 | 0.802 | 0.292 |

Figure 10A:
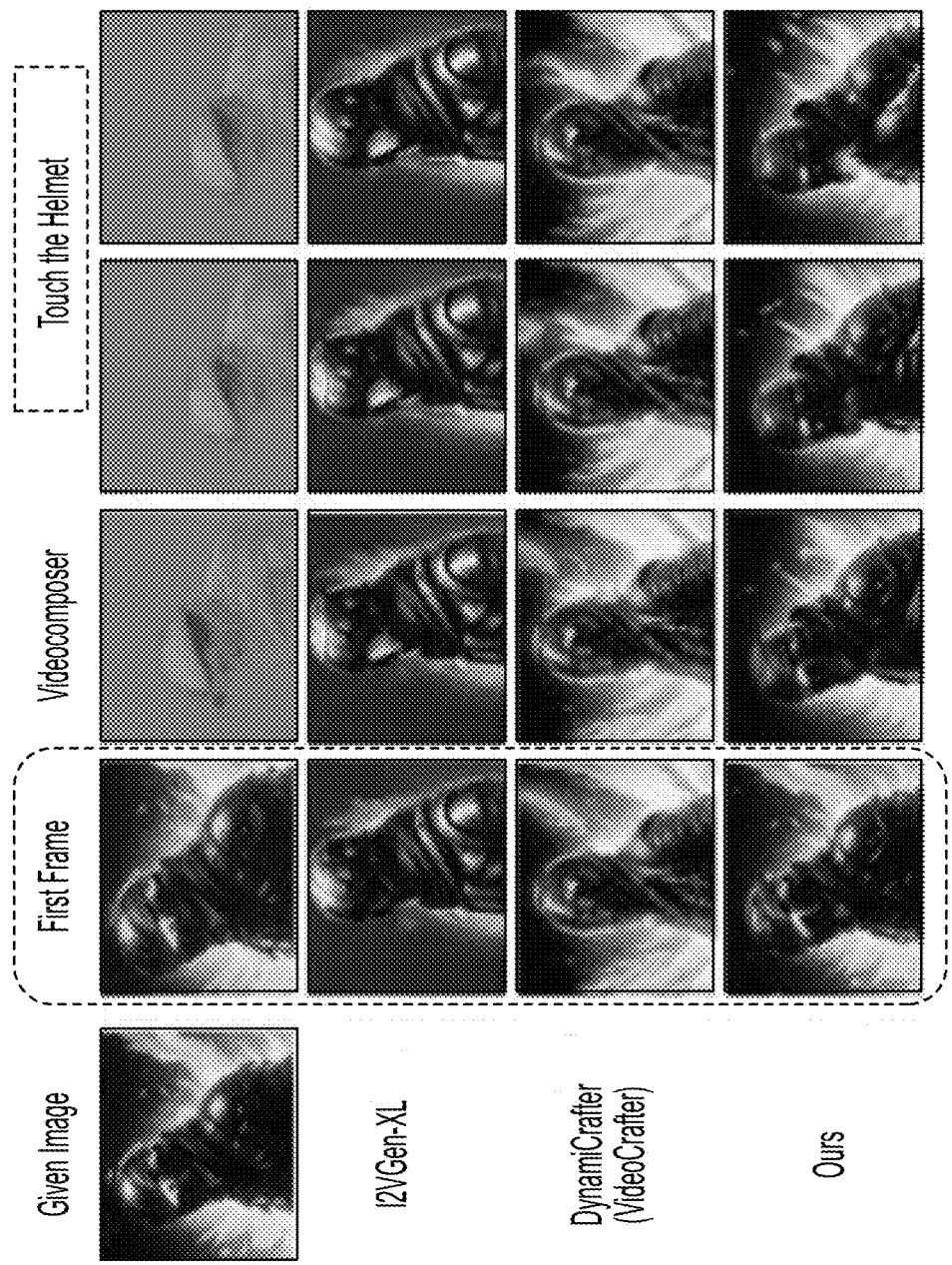
FIGS. 10A-10B show example results of applying VDM to image animation compared with existing models, according to some embodiments described herein.
Figure 10B:
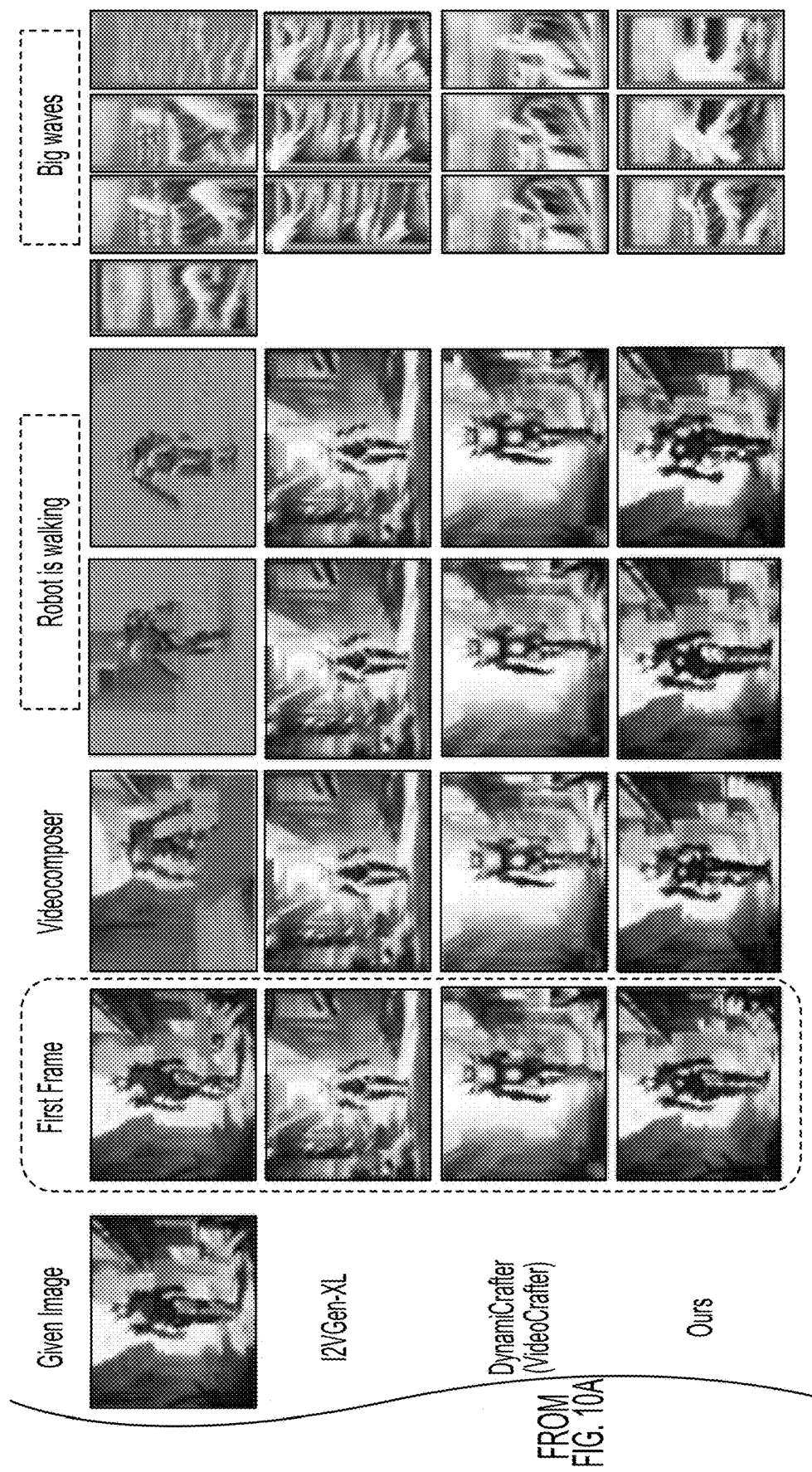

FIGS. 10A-10B show example results of applying VDM to image animation compared with existing models such as I2VGEN-XL, DynamiCrafter and Video-Composer. To assess image animation capabilities, 128 video-text pairs are selected from the Webvid evaluation set, covering diverse themes. DINO (First) is used to measure the similarity between the first frame of the animated video and the conditioning image, DINO (Average) for the average similarity across all video frames compared to the conditioning image, and CLIP-T for the overall alignment between text prompts and the animated video across frames. As shown in Table 2, VDM outperforms others in all metrics, demonstrating superior identity preservation, temporal consistence and text alignment.

TABLE 2

| | DINO (First) | DINO (Avg.) | CLIP-T (Avg) |
| --- | --- | --- | --- |
| GT | 0.781 | 0.644 | — |
| I2VGen-XL | 0.624 | 0.573 | 0.232 |
| VideoComposer | 0.751 | 0.285 | 0.269 |
| VDM | 0.765 | 0.614 | 0.284 |

As shown in FIG. 10B, VDM outputs are compared qualitatively with I2VGEN-XL DynamiCrafter, and Video-Composer. It is observed that the identity or appearance in animated videos from I2VGEN-XL and DynamiCrafter is different from the original image. While VideoComposer replicates the conditioning image as the first frame, subsequent frames show abrupt changes in appearance, as indicated by its high DINO (First) and low DINO (Average) scores in Table 2. VDM, in contrast, utilizes multimodal cross-attention layers and condition masks, and excels by promoting the similarity between the first frame of the animated video and the conditioning image, maintaining more effectively appearance, and enabling animation in line with text prompts.

Figure 11:
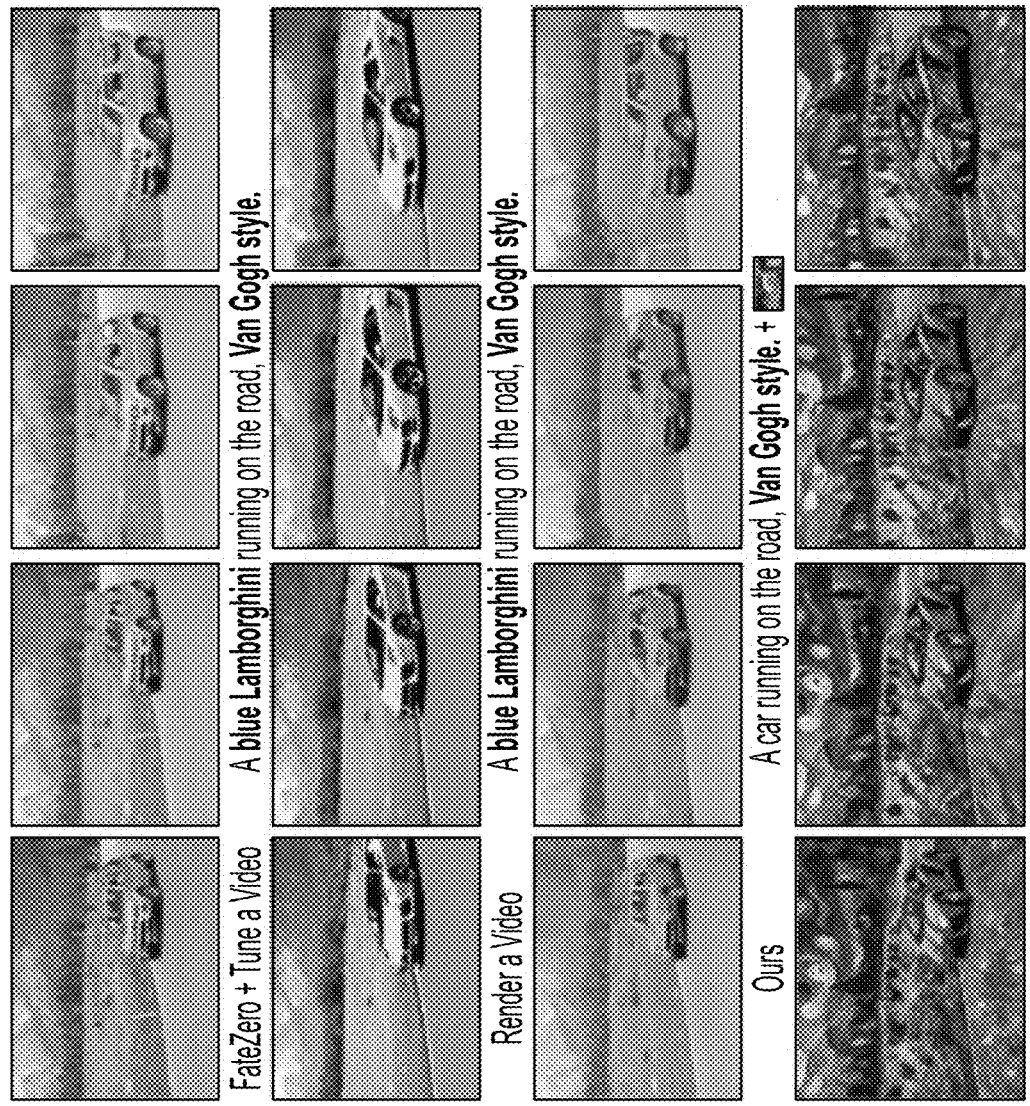
FIG. 11 shows example use cases of applying VDM for video editing, according to embodiments described herein.

FIG. 11 shows example use cases of applying VDM for video editing. For example, the text input 102 in FIG. 1 may comprise a video editing instruction, and the image input 104 in FIG. 1 may comprise a visual guidance for video editing. The video output is thus generated by the VDM to edit a source video by iteratively denoising the source video based on a combined cross-attention of the image cross-attention feature and the text cross-attention feature. Therefore, the video output is an edited version of the source video conditioned on the image input and the text input.

The VDM video editing is compared with four video editing methods: FateZero, Pix2Video, Text2Video-Zero, and Render-A-Video. Specifically, Render-A-Video and Text2Video-Zero employ customized models that incorporate ControlNet. In contrast, VDM utilizes the base VDM model without integrating ControlNet. Following the FateZero and Pix2Video, 72 videos are used from various in-the-wild sources. Three metrics are shown in Table. 3: Fram-Acc, a CLIP-based measure of frame-wise editing accuracy; Tmp-Con, assessing the cosine similarity between consecutive frames using CLIP; and Pixel-MSE, the averaged mean-squared pixel error between aligned consecutive frames. VDM excels in temporal consistency and ranks second in frame editing accuracy. In fact, the baseline models typically utilize image models with frame propagation or cross-frame attention mechanisms, which tend to yield worse temporal consistency compared to VDM. This demonstrates the clear advantage of using foundation VDMs for video editing, compared to those relying on image models.

TABLE 3

| Metric | FateZ | Pix2V | T2V-Z | Render-A-V | VDM |
|---|---|---|---|---|---|
| Fram-Acc (↑) | 0.534 | 0.978 | 0.943 | 0.959% | 0.976 |
| Tem-Con (↑) | 0.953 | 0.942 | 0.963 | 0.965 | 0.986 |
| Pixel-MSE (↓) | 0.092 | 0.256 | 0.091 | 0.073 | 0.064 |
| User-Balance | 4.4% | 6.2% | 7.4% | 21.4% | 60.6% |
| User-Temporal | 3.6% | 2.0% | 3.8% | 18.2% | 72.4% |
| User-Overall | 3.1% | 3.1% | 7.0% | 24.6% | 62.2% |

As shown in FIG. 11, FateZero reconstructs the input sports car frame well but the result is not aligned with the prompt. Render-A-Video struggles to swap the jeep to a sports car, facing challenges with shape changes. Conversely, VDM adeptly replaces the jeep with a sports car as specified in the conditioning image while also adhering to the text prompts.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of video generation conditioned on an image and a text description, the method comprising:
encoding an image input depicting a visual appearance of a target object into an image feature vector;
encoding a text input describing a target video containing the target object into a text feature vector;
attending, at an image cross-attention layer within a video diffusion model (VDM), the image feature vector and a latent feature vector of the VDM into an image cross-attention feature;
attending, at a text cross-attention layer within the VDM, the text feature vector and the latent feature vector into a text cross-attention feature; and
generating, by the VDM, a video output based on a combined cross-attention of the image cross-attention feature and the text cross-attention feature.

2. The method of claim 1, wherein the VDM comprises one or more multimodal video blocks, and wherein each multimodal video block comprises one or more of:
a spatial convolution layer;
a self-attention layer;
the image cross-attention layer;
the text cross-attention layer operated in parallel; and
a temporal-attention layer that receives the combined cross-attention from the image cross-attention layer and the text cross-attention layer.

3. The method of claim 2, wherein the latent feature vector of the VDM is generated by the spatial convolution layer and the self-attention layer from an input to a respective multimodal video blocks.

4. The method of claim 2, further comprises:
generating, by the temporal-attention layer, a respective multimodal video block output that captures temporal features from the combined cross-attention; and
feeding the respective multimodal video block output to a next multimodal video block.

5. The method of claim 1, wherein the video output is generated by the VDM iteratively removing noises from an initialized vector conditioned on the image input and the text input over one or more iterations.

6. The method of claim 5, wherein the iteratively removing noises further comprises:
at each iteration, the VDM generates an updated vector output from a previous vector output from a previous iteration based on the combined cross-attention from the image cross-attention layer and the text cross-attention layer.

7. The method of claim 1, further comprising training the VDM using a training video and a training text, wherein the training comprises:
sampling a video frame from the training video as a conditioning image;
iteratively adding a noise term to the training video into a noised video;
iteratively, by the VDM, denoising the noised video by predicting an added noise term conditioned on the conditioning image and the training text; and
updating the VDM based on a loss objective computed based on a difference between the noised term and the predicted added noise term.

8. The method of claim 7, wherein the predicting the added noise term conditioned on the conditioning image and the training text is performed based on a combined cross-attention of the image cross-attention feature corresponding to the conditioning image and the text cross-attention feature corresponding to the training text.

9. The method of claim 1, wherein the text input comprises a video editing instruction, and the image input comprises a visual guidance for video editing, and wherein the video output is generated by the VDM to edit a source video by iteratively denoising the source video based on a combined cross-attention of the image cross-attention feature and the text cross-attention feature, wherein the video output is an edited version of the source video conditioned on the image input and the text input.

10. The method of claim 1, wherein the video output comprises an image animation of the target object.

11. A system of video generation conditioned on an image and a text description, the system comprising:
a memory storing a video diffusion model (VDM) and a plurality of processor-executed instructions; and
one or more processors that execute the plurality of processor-executed instructions to perform operations comprising:
encoding an image input depicting a visual appearance of a target object into an image feature vector;
encoding a text input describing a target video containing the target object into a text feature vector;
attending, at an image cross-attention layer within the video diffusion model (VDM), the image feature vector and a latent feature vector of the VDM into an image cross-attention feature;
attending, at a text cross-attention layer within the VDM, the text feature vector and the latent feature vector into a text cross-attention feature; and
generating, by the VDM, a video output based on a combined cross-attention of the image cross-attention feature and the text cross-attention feature.

12. The system of claim 11, wherein the VDM comprises one or more multimodal video blocks, and wherein each multimodal video block comprises one or more of:
a spatial convolution layer;
a self-attention layer;
the image cross-attention layer;
the text cross-attention layer operated in parallel; and
a temporal-attention layer that receives the combined cross-attention from the image cross-attention layer and the text cross-attention layer.

13. The system of claim 12, wherein the latent feature vector of the VDM is generated by the spatial convolution layer and the self-attention layer from an input to a respective multimodal video blocks.

14. The system of claim 12, wherein the operations further comprise:
generating, by the temporal-attention layer, a respective multimodal video block output that captures temporal features from the combined cross-attention; and
feeding the respective multimodal video block output to a next multimodal video block.

15. The system of claim 11, wherein the video output is generated by the VDM iteratively removing noises from an initialized vector conditioned on the image input and the text input over one or more iterations.

16. The system of claim 15, wherein the operation of iteratively removing noises further comprises:
at each iteration, the VDM generates an updated vector output from a previous vector output from a previous iteration based on the combined cross-attention from the image cross-attention layer and the text cross-attention layer.

17. The system of claim 11, wherein the operations further comprise training the VDM using a training video and a training text, wherein the training comprises:
sampling a video frame from the training video as a conditioning image;
iteratively adding a noise term to the training video into a noised video;
iteratively, by the VDM, denoising the noised video by predicting an added noise term conditioned on the conditioning image and the training text; and
updating the VDM based on a loss objective computed based on a difference between the noised term and the predicted added noise term.

18. The system of claim 17, wherein the operation of predicting the added noise term conditioned on the conditioning image and the training text is performed based on a combined cross-attention of the image cross-attention feature corresponding to the conditioning image and the text cross-attention feature corresponding to the training text.

19. The system of claim 11, wherein the text input comprises a video editing instruction, and the image input comprises a visual guidance for video editing, and wherein the video output is generated by the VDM to edit a source video by iteratively denoising the source video based on a combined cross-attention of the image cross-attention feature and the text cross-attention feature, wherein the video output is an edited version of the source video conditioned on the image input and the text input.

20. A non-transitory processor-readable storage medium storing a plurality of processor-executable instructions for video generation conditioned on an image and a text description, the instructions being executed by one or more processors to perform operations comprising:
encoding an image input depicting a visual appearance of a target object into an image feature vector;
encoding a text input describing a target video containing the target object into a text feature vector;
attending, at an image cross-attention layer within a video diffusion model (VDM), the image feature vector and a latent feature vector of the VDM into an image cross-attention feature;
attending, at a text cross-attention layer within the VDM, the text feature vector and the latent feature vector into a text cross-attention feature; and
generating, by the VDM, a video output based on a combined cross-attention of the image cross-attention feature and the text cross-attention feature.

* * * * *